United States Patent
Klein

[15] 3,637,086
[45] Jan. 25, 1972

| [54] | CONNECTING HOOK | | |
|---|---|---|---|
| [72] | Inventor: | Herbert H. Klein, Arlington Heights, Ill. | |
| [73] | Assignee: | Unarco Industries, Inc., Chicago, Ill. | |
| [22] | Filed: | May 7, 1970 | |
| [21] | Appl. No.: | 35,419 | |
| [52] | U.S. Cl. | ............................211/176, 5/296 | |
| [51] | Int. Cl. | ............................A47f 5/10 | |
| [58] | Field of Search | ............211/176, 177, 184, 148; 5/288, 5/296, 282, 286 | |

[56] References Cited

UNITED STATES PATENTS

| 2,815,130 | 12/1957 | Franks | 211/148 |
| 3,273,847 | 9/1966 | Berman | 211/148 X |
| 3,135,491 | 6/1964 | Knape | 211/148 X |
| 3,490,604 | 1/1970 | Klein | 211/177 |
| 3,456,970 | 7/1969 | Sunasky | 211/148 X |
| 2,795,801 | 6/1957 | Edelen | 5/296 |
| 3,368,227 | 2/1968 | Underdown | 5/296 |

Primary Examiner—Nile C. Byers, Jr.
Attorney—Lettvin and Gerstman

[57] ABSTRACT

A connecting hook for knockdown racks that have hollow upright posts to which horizontal supporting members are connected through a connecting plate. An opening in the connecting plate is aligned with an opening in the vertical post and the connecting hook is swung into the opening from the outside of the post to lock the connector plate in positional engagement with the upright post.

5 Claims, 4 Drawing Figures

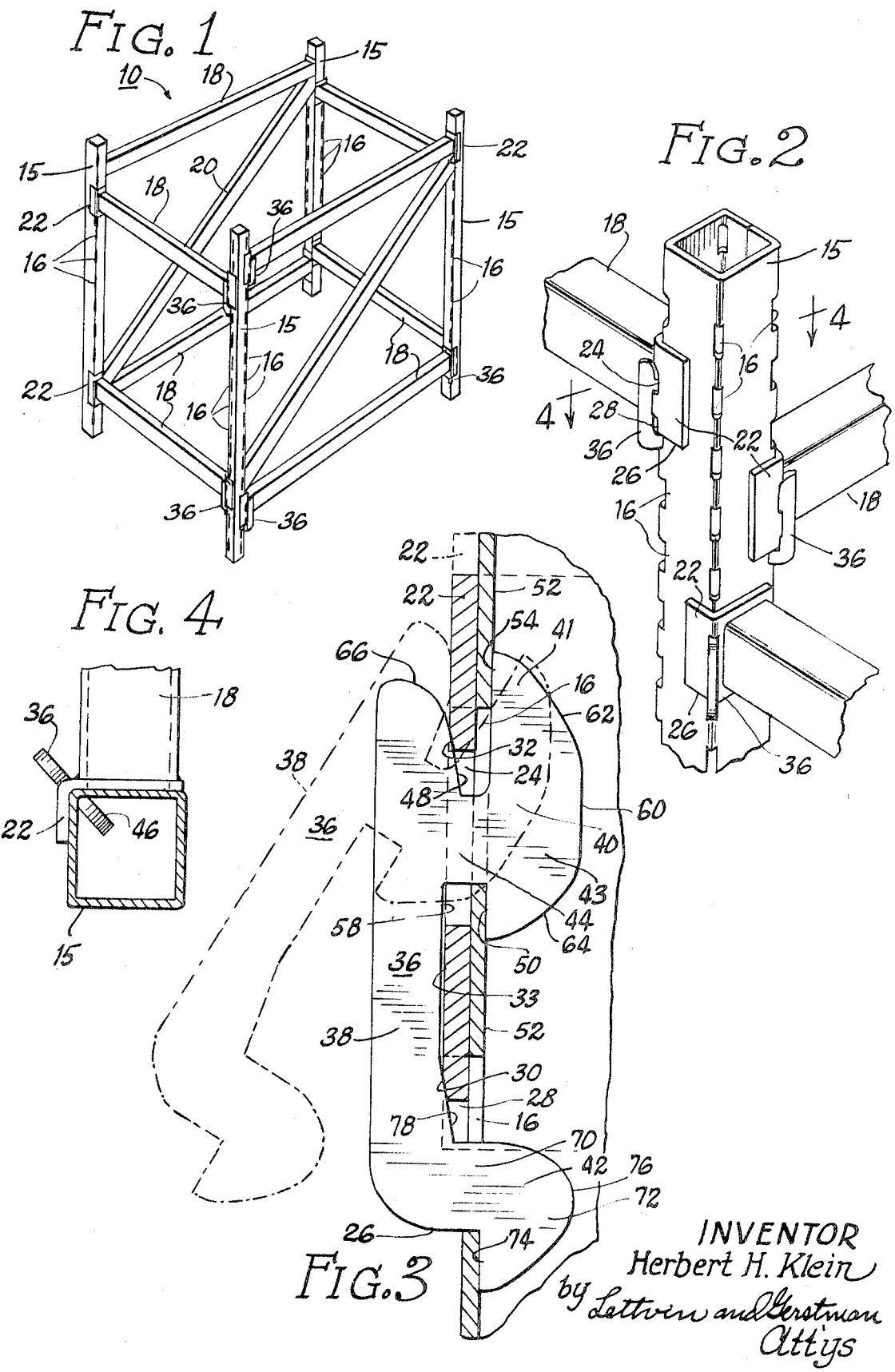

CONNECTING HOOK

FIELD OF THE INVENTION

This invention relates to a connecting hook for connecting horizontal supporting members to the hollow upright posts of a knockdown rack.

BACKGROUND OF THE INVENTION

Knockdown racks having slotted hollow upright posts to which horizontal supporting members are connected by hook devices have been widely used for storage shelving and pallet racks. Such structures are typically shown in the patents to Franks U.S. Pat. No. 2,815,130 and Klein U.S. Pat. No. 3,490,604. Both of these prior patents show a connection device which is required to be inserted from the inside of the upright post to connect the horizontal supporting members to the upright posts. However, making the interior of the post accessible to manual connection of a hook device weakens the post. It is, therefore, desirable to provide hook devices that could connect from the outside of the post, but the hook devices in said patents cannot accomplish the desired purpose.

It is therefore an object of this invention to provide an improved locking member which can be secured from the outside of the post to connect horizontal supporting members to hollow vertical posts. The locking member of the present invention is effective in operation, simple to manufacture, and it provides a secure lock between the connecting plate carried by the horizontal supporting member and the upright post.

SUMMARY OF THE INVENTION

In accordance with the present invention, there is provided an exterior connecting hook which comprises an elongated shank of a length to span at least two openings in the upright post. The hook has three abutment portions which are spaced from each other and carried by the shank. The abutment portions provide abutment edges spaced from the shank and adapted to engage the inner side of the post.

Each abutment portion has a free end with the first free end pointing upwardly and the other two free ends pointing downwardly. The shank has two upwardly and outwardly inclined edges positioned to be engaged by portions of the apertured plate under force of gravity to bias a pair of oppositely pointing free ends of the abutment portions against the underside of the post.

The portions of the shank located between the inclined edges are spaced from the abutment edges on the abutment portions outwardly of the inclined edges so as to be free from contact with an apertured plate carried by a transverse connecting member, to accommodate entry of the downwardly pointing abutment portions through apertures in the post after the upwardly pointing abutment portion has been just entered into the post through aligned apertures in the aperture plate and post.

In the illustrative embodiment of the invention, the one abutment portion whose free end points upwardly is formed integrally with one of the abutment portions whose free end points downwardly, so as to provide a generally T-shaped portion extending laterally of the hook's shank.

A more detailed explanation of the invention is provided in the following description and claims, and is illustrated in the accompanying drawing.

BRIEF DESCRIPTION OF THE DRAWING

FIG. 1 is a perspective view of a rack unit embodying the invention;

FIG. 2 is a partial perspective view on an enlarged scale, showing the connection between horizontal support bars and an upright post;

FIG. 3 is a fragmentary sectional elevation through an assembled supporting member and post illustrating the manner of insertion of the locking member; and FIG. 4 is a fragmentary sectional view of the connection between a horizontal supporting member and an upright post, taken along the line 4—4 of FIG. 2.

DETAILED DESCRIPTION OF THE ILLUSTRATIVE EMBODIMENT

Referring to FIG. 1, the knockdown rack 10 includes hollow upright posts 15 formed of tubular sheet metal and having a generally square cross-sectional configuration. Each of the posts has vertically spaced equal sized openings 16 at the corners and the posts are connected by horizontal supporting members 18 and diagonal braces 20 to provide a substantially rigid assembly. Horizontal supporting members 18 are detachably connected to the vertical posts through connecting plates 22 which are fastened, such as by welding, to the ends of the horizontal supporting members 18.

Each of the connecting plates 22 has an opening 24 that is the same size as the openings 16. Referring to FIG. 3, each connecting plate 22 also has a lower slot 28 with the adjacent surface 30 above slot 28 being coined as is the surface 32 directly above and adjacent to opening 24. It can be seen that the top surface defining opening 24 is spaced from the top surface defining slot 28 a distance that is equal to the distance between the top surfaces defining adjacent openings 16.

Connecting plates 22 are fastened to the upright posts by means of connecting hooks 36 which are swung into the connecting plate and upright posts openings to provide a securely locked connection. Connecting hooks 36 comprise an elongated shank 38 of a length to span at least two openings in the post, a generally T-shaped retaining member 40 extending from the shank 38 and having two abutment portions 41 and 43, and a third abutment portion 42 extending from the shank 38. The base 43 of the T is substantially perpendicular to shank 38 and abutment portion 43 is spaced from the closest edge 58 of the shank a distance that permits the undersurface 50 of the abutment portion 43 to engage the inside surface 52 of the post 15 while the closest edge 58 of the shank is slightly spaced from wall 33 of the connecting plate. Abutment portion 41 is spaced from edge 48 of the shank a distance that permits undersurface 54 to engage surface 52 while edge 48 engages wall 32 of the connecting plate. Edge 48 is inclined to provide a wedging action with upright 15 and plate 22, as shown most clearly in FIG. 3.

The undersurfaces 50 and 54 of abutment portions 43 and 41, respectively, are substantially vertical. In this manner, shank 38 remains on the outside of the system, undersurfaces 50 and 54 abut the vertical inside surface 52 of the post, and inclined surface 48 of shank 38 engages coined surface 32 of connecting plate 22 to wedge connecting plate 22 and post 15 together.

The top surface 60 of the retaining member 40 has curved portions 62 and 64 and the top of the shank 38 has a rounded edge surface 66, all of which cooperate to permit swinging of the retaining member into the post and connecting plate openings.

Abutment portion 42 has a neck portion 70 that extends normally to the shank and a head portion 72 which has a vertical surface 74 for engaging the inside surface 52 of the post. Head portion 72 has a rounded edge surface 76 to permit the head portion to be swung into groove 28 and opening 16, as illustrated in FIG. 3. The edge 78 of shank 38 adjacent hook member 42 is inclined to engage coined surface 30 and to provide a wedging surface.

Surfaces 50, 54 and 74 are vertical and are coplanar so that all three surfaces provide simultaneous and cooperative engagement with inside surface 52 of post 15.

To attach a horizontal supporting member 18 to an upright post, the connecting plate 22 of the horizontal supporting member is placed against the upright post so that opening 24 of connecting plate 22 is aligned with opening 16. Retaining member 40 is then placed into both openings, in the manner illustrated in dashed representation in FIG. 3, and connecting hook 36 is swung in a counterclockwise direction (with respect to FIG. 3) so that abutment portion 42 can enter a lower opening 16 of the upright. As soon as abutment portion 42 has entered the lower opening 16 and abutment surface 74 of the abutment portion is on the inside of the upright, the horizontal supporting member 18 is dropped so that connecting plate 22 will be lowered to wedge against inclined surfaces 48 and 78 of shank 38. In this manner, a secure lock will be provided and any tendency of the horizontal supporting member 18 to move with respect to upright post 15 will be prevented.

Although an illustrative embodiment of the invention has been shown and described, it is to be understood that various substitutions and modifications may be made by those skilled in the art without departing from the spirit and scope of the present invention.

What I claim is:

1. An exterior connecting hook for knockdown racks including an upright post with a vertical series of equally spaced openings therein and transverse connecting members that include an apertured plate matingly related to the exterior of the post with an opening in the plate and a wall of the plate below the opening corresponding respectively in vertical size with an opening in the post and the spacing of openings on the post, said connecting hook comprising, in combination, an elongated shank of a length to span at least two openings in the post, three abutment portions spaced from each other and carried by said shank and providing abutment edges thereon spaced from the shank and adapted to engage the inner side of a post, each abutment portion having a free end with the first free end pointing upwardly and the other two free ends pointing downwardly, the shank extending upwardly to provide an uppermost portion thereof spaced opposite from the uppermost abutment portion and having a rounded edge on said uppermost portion facing said abutment edge on the uppermost abutment portion, the shank having two upwardly and outwardly inclined edges positioned to be engaged by portions of the apertured plate under force of gravity to bias a pair of oppositely pointing free ends of said abutment portions against the inner side of a post, and the portion of the shank located between said inclined edges being spaced from the abutment edges on the abutment portions outwardly of said inclined edges so as to be free from contact with the apertured plate and to accommodate entry of the downwardly pointing abutment portions through apertures in the post after the upwardly pointing abutment portion has been first entered into the post through aligned apertures in the apertured plate and post.

2. A hook as in claim 1 wherein the one abutment portion whose free end points upwardly is formed integrally with one of the abutment portions whose free end points downwardly, so as to provide a generally T-shaped portion extending laterally of the hook's shank.

3. A hook as in claim 2 wherein the edges of the branches of the T which face the shank are aligned and adapted for abutment with a post, but the portions of the edge of the shank which face the said aligned edges of the T are not aligned and are spaced different amounts from the edges of the branches of the T.

4. A hook as in claim 2 wherein the edge portions of the branches of the T that are distal from the shank are rounded at their upper and lower extremities to provide for swinging entrance of the sections of the T-portion through aligned apertures in a plate and apertured post.

5. A hook as in claim 2 wherein the third abutment portion is offset laterally of the hook's shank and provides an abutment edge thereon spaced from but aligned with the spaced abutment edges on the T-portion and the edge of the third abutment portion distal from the shank being rounded adjacent the downwardly pointing free end to accommodate swinging of the abutment portion through an aperture in a post after the one upwardly pointing abutment portion has first been entered through aligned apertures in a plate and post.

* * * * *